Feb. 4, 1958           P. P. LOVE           2,822,222
BEARING WITH OIL RECESS

Filed Dec. 10, 1954                           2 Sheets-Sheet 1

INVENTOR.
PHIL PRINCE LOVE
BY
Brown, Critchlow, Flick & Peckham
HIS ATTORNEYS

Feb. 4, 1958 P. P. LOVE 2,822,222
BEARING WITH OIL RECESS
Filed Dec. 10, 1954 2 Sheets-Sheet 2

INVENTOR.
PHIL PRINCE LOVE
BY
Brown, Critchlow, Flick & Peckham
HIS ATTORNEYS

United States Patent Office 2,822,222
Patented Feb. 4, 1958

2,822,222
BEARING WITH OIL RECESS

Phil Prince Love, Wembley, England, assignor to Johnson Bronze Company, New Castle, Pa., a corporation of Pennsylvania Application December 10, 1954, Serial No. 474,412

2 Claims. (Cl. 308—122)

This invention relates to bearings of the interchangeable type used as connecting rod bearings in reciprocating engines.

In engines of this type a maximum load is imposed on the bearing for a short period in the vicinity of the top dead-center position of the crank pin. A load which is lighter but also fairly heavy and of longer duration is imposed during another portion of the rotation of the crank shaft.

It is customary to lubricate such bearing by introducing oil under pressure through an oil hole in the crank pin, which delivers oil to the middle part of the bearing surface. However, in a simple ungrooved bearing it is impossible to achieve the best conditions of lubrication in view of the unequal loads during different portions of the cycle of rotation.

The present invention has for its object to provide a bearing of the interchangeable type having a recess and passages whereby an adequate pressure film of oil is built up and maintained in the areas subject to the heavier loads.

A special object is to provide in the surface of the bearing a relatively wide recess disposed in advance of the region of heaviest load, and tapered circumferentially in the direction of rotation of the crank pin, so as to produce a pressure oil film in said region. Passages formed in the bearing feed oil from the oil hole in the crank pin to the tapered recess. These passages are arranged so as to distribute an oil film over the secondary pressure area of the bearing.

These and other objects and advantages of the invention will become apparent as the description proceeds.

Figure 1:
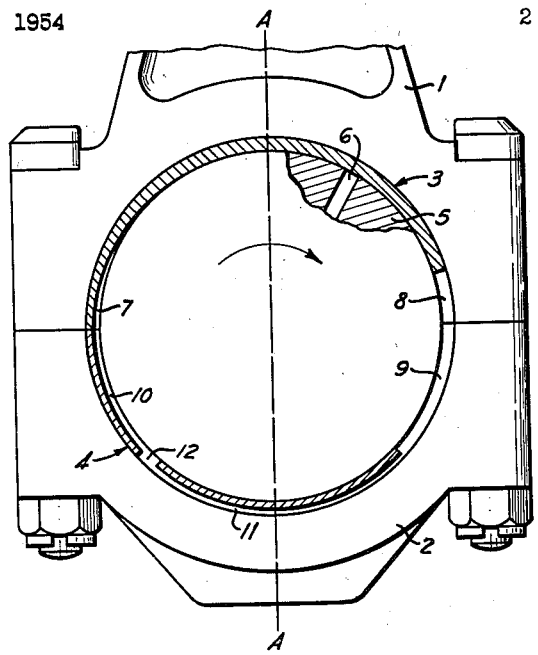
Fig. 1 is an elevation partly in section of a connecting rod bearing assembly according to the present invention.

Referring to the drawings more particularly, the assembly includes a connecting rod 1 provided with the usual cap 2. Clamped between the rod and cap are a rod bearing 3 and a cap bearing 4. The crank pin 5, which has a close sliding fit in the bearings, rotates in the direction of the arrow and is provided with a radially extending oil hole 6, which receives oil under pressure from a series of passages formed in the crank shaft and crank throws.

The two bearing halves 3 and 4 are thin semicircular members usually referred to as interchangeable connecting rod bearings.

Figure 2:
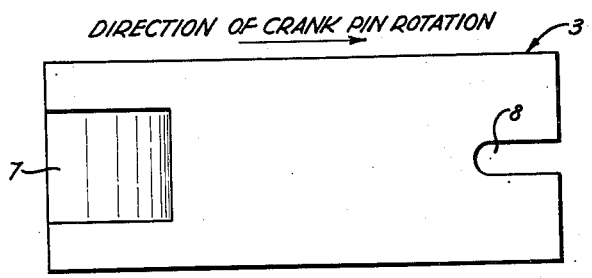
Fig. 2 is a development of the rod half-bearing.

The rod bearing 3, which is shown in a flat development in Fig. 2, is formed with a surface recess 7. This recess 7 covers a substantial portion of the width of the bearing, its width being approximately half the total width of the bearing. The recess 7 begins at the left-hand end of the rod bearing as viewed in the drawing, this end being the "leading" end of the bearing so far as the direction of rotation of the crank pin is concerned. The recess 7 is at full depth at the leading edge of the rod bearing 3, and gradually becomes shallower until it merges with the surface at about 60° from the leading edge.

The opposite or trailing end of the rod bearing 3 is formed with a slot 8 cut entirely through the bearing. This slot 8, which starts at the trailing edge, extends back a short distance toward the middle of the bearing and is relatively narrow.

The cap bearing 4 has its leading edge formed with a slot 9 which mates with the slot 8 of the rod bearing. The slots 8 and 9 together extend over approximately 60° of the circumference of the bearing.

The trailing edge of the cap bearing 4 is formed with a surface recess 10, which is of the same width as recess 7, and is of the same depth as the leading end of recess 7. The two recesses 7 and 10 form a surface recess which begins approximately 225° ahead of top dead center and ends approximately 330° ahead of top dead center.

The cap bearing 4 is also formed on its outer side (the side next to cap 2) with an oil groove 11 which at its leading end communicates with slot 9, and at its trailing end communicates with recess 10 by way of a radial bore 12.

Operation

In the position of the parts illustrated, the crank pin is at top dead center. It should be explained that in this position the heaviest load is placed on the bearing due to the fact that the gas in the cylinder has just been fired forcing the connecting rod downward with maximum pressure. The area of the bearing adjacent the top center of the bearing may therefore be called the "primary pressure area."

The oil hole 6 in the crank pin is located in advance of top dead center. To secure optimum results the oil hole 6 should be disposed from 20° to 90° ahead of top dead center. When the crank pin rotates clockwise, i. e., in the direction of the arrow, the oil hole 6 soon registers with the leading end of slot 8 with the result that oil under pressure fills the combined slot 8—9, the groove 11, and the combined recess 10—7. As the result of this oil pressure in these recesses, an efficient distribution of oil to bearing areas that will be under heavy load is made as follows.

Oil from the combined slot 8—9 spreads to surrounding bearing areas and is carried forward by the rotating crank pin. In this way an efficient oil film is distributed over the parts of the bearing located at from 90° to 180° past top dead center. During the power stroke this area of the bearing is subjected to a heavy load imposed by the remaining gas pressure combined with the inertia load. This area may therefore be called the "secondary pressure area."

In addition, the oil under pressure fills the combined recess 10—7 while the crank pin is only about 80° past dead center. At this time there is no heavy pressure between the crank pin and the bearing in the area from 270° to top dead center, and hence the oil can spread from the surface recess over this area of the bearing. Moreover, the crank pin, as it rotates from the 80° position to top dead center, can carry the oil forward from the tapered recess to create a pressure oil film in the "primary pressure area."

In this way a pressure film of oil is built up between the bearing and the crank pin before the high pressure is applied at the top dead center position.

Figure 3:
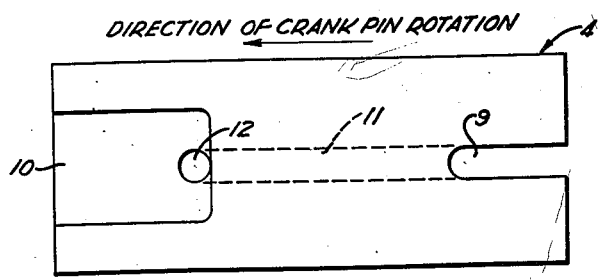
Fig. 3 is a development of the cap half-bearing.
Figure 4:
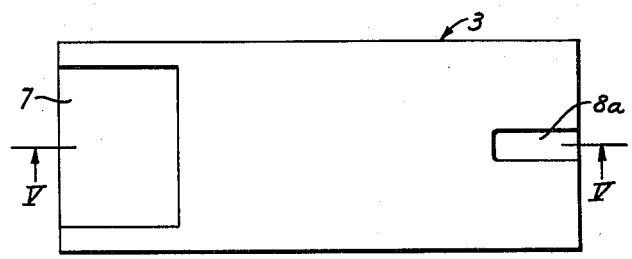
Fig. 4 is a view similar to Fig. 2 of a modified structure.
Figure 5:
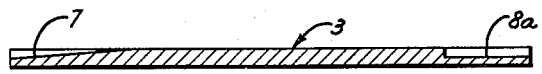
Fig. 5 is a section on line V—V of Fig. 4.
Figure 7:
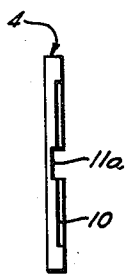
Fig. 7 is an end view of the structure of Fig. 6.
Figure 6:
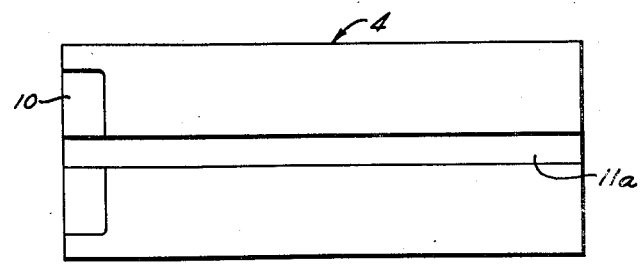
Fig. 6 is a view similar to Fig. 3 of the modified structure.

It will be understood that the invention may be practiced while departing somewhat from the details illustrated in Figs. 1 to 3 inclusive. The tapered recess 7 may extend from a maximum depth at the leading edge of the rod half-bearing to zero depth at between 30° and 90° from the leading edge. The recess 7 may have a maximum depth of from 0.1% to 0.5% of the bearing radius.

In the modification illustrated in Figs. 4–7 inclusive, the tapered recess 7 in the rod half-bearing is similar to the recess 7 of Fig. 2, but is shown as somewhat wider. The recess 10 in the cap half-bearing 4 is of less circumferential length than the analogous recess 10 of Fig. 2.

In this modification a different arrangement of passages is used to supply oil to the combined recess 10—7. The trailing edge of the rod half-bearing is formed with a surface recess 8a which is of a shape and area similar to the slot 8 of Fig. 2. The cap half-bearing is formed with a surface groove 11a which leads from the recess 8a to the combined recess 10—7. This modified structure also serves to build up oil films at the areas of highest load.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In a bearing for a connecting rod operating on a crank pin, the combination which comprises a crank pin and a connecting rod bearing; the crank pin having a single oil outlet hole opening to the bearing, the oil hole being located from 20° to 90° ahead of the top dead-center position; the connecting rod bearing being formed with an oil-receiving depression which begins at approximately 75° ahead of top dead-center and extends for about 60° in the direction of rotation, this depression being of a width less than one-fourth as great as the width of the bearing face; the connecting rod bearing being also formed with a surface recess beginning approximately 225° ahead of the top dead-center and ending approximately 330° ahead of top dead-center, this recess being of a width equal to approximately half the width of the bearing face, and having a depth tapering from a maximum at approximately 225° ahead of top dead-center to zero depth at approximately 330° ahead of top dead-center; the connecting rod bearing being also formed with a circumferential passage which connects the oil-receiving depression with the surface recess.

2. A device as specified in claim 1 in which the surface recess is tapered in depth, from a maximum depth of from 0.1% to 0.5% of the bearing radius, to zero depth.

References Cited in the file of this patent

FOREIGN PATENTS 71,289     Sweden _____ Feb. 5, 1929